United States Patent
Loesche et al.

(10) Patent No.: US 12,533,856 B2
(45) Date of Patent: Jan. 27, 2026

(54) METHODS AND TOOLS FOR FORMING COMPOSITE STRUCTURES WITH PREFERABLE WRINKLE CONFIGURATIONS

(71) Applicant: The Boeing Company, Arlington, VA (US)

(72) Inventors: Christopher R. Loesche, Bothell, WA (US); Marcus C. Hart, Edmonds, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/458,873

(22) Filed: Aug. 30, 2023

(65) Prior Publication Data
US 2025/0074016 A1   Mar. 6, 2025

(51) Int. Cl.
| | | |
|---|---|---|
| *B29C 70/30* | (2006.01) | |
| *B29C 70/20* | (2006.01) | |
| *B29C 70/34* | (2006.01) | |
| *B29L 31/30* | (2006.01) | |

(52) U.S. Cl.
CPC .......... *B29C 70/342* (2013.01); *B29C 70/205* (2013.01); *B29K 2995/0094* (2013.01); *B29L 2031/3076* (2013.01)

(58) Field of Classification Search
CPC ... B29C 70/205; B29C 70/446; B29C 70/462; B29C 70/543; B29C 70/56
See application file for complete search history.

(56) References Cited

U.S. PATENT DOCUMENTS

| | | | | |
|---|---|---|---|---|
| 4,775,560 A | * | 10/1988 | Katsura .............. | B65D 81/3446 426/523 |
| 6,114,012 A | * | 9/2000 | Amaoka ............ | B29D 99/0007 244/119 |
| 8,864,075 B2 | * | 10/2014 | Gray ....................... | B64C 1/064 244/119 |
| 2007/0138695 A1 | * | 6/2007 | Krogager .............. | B29C 70/462 244/119 |
| 2011/0250381 A1 | * | 10/2011 | Nyman .................. | B29C 70/342 428/114 |
| 2014/0127473 A1 | * | 5/2014 | Kline ...................... | B29C 33/42 156/196 |
| 2015/0283766 A1 | | 10/2015 | Williams et al. | |
| 2017/0239876 A1 | * | 8/2017 | Stawski .................. | B29C 53/02 |
| 2022/0118718 A1 | | 4/2022 | Parkinson et al. | |
| 2023/0182417 A1 | | 6/2023 | Saini et al. | |

OTHER PUBLICATIONS

Jan. 29, 2025. European Patent Office, Extended European Search Report in related application EP 24 19 2060.

* cited by examiner

*Primary Examiner* — Matthew J Daniels
(74) *Attorney, Agent, or Firm* — Kolitch Romano Dascenzo Gates LLP (57) ABSTRACT

Methods and tools for forming a composite structure with a desired wrinkle configuration are disclosed herein. An example method includes shaping a composite material using a tool. In some examples, the shaping comprises forming a desired wrinkle configuration in the conformable material. An example tool for forming a composite structure includes a curved region comprising undulations in at least one portion of the curved region, the undulations configured such that when a conformable material is draped over the curved region, a desired wrinkle configuration is imparted to the conformable material.

20 Claims, 7 Drawing Sheets

METHODS AND TOOLS FOR FORMING COMPOSITE STRUCTURES WITH PREFERABLE WRINKLE CONFIGURATIONS

FIELD

The present disclosure relates to methods and tools for forming composite structures.

BACKGROUND

Composite structures are typically formed by conforming flexible sheets of composite material to a tool, such as a rigid mold, and then curing the composite material. Due to the nature of conforming a generally planar sheet of material to a tool having curvature, including varying degrees and angles of curvature, avoiding imparting undesirable wrinkles to the composite material becomes difficult. Such wrinkling or other anomalies created during forming may not be acceptable to meet the performance requirements of the final composite structure. Additionally, the removal of undesirable wrinkles is difficult and time-consuming, often involving adding an additional step in the manufacturing process and the inclusion of another tool.

SUMMARY

Methods and tools for forming a composite structure with a desired wrinkle configuration are disclosed herein. An example method includes shaping a composite material using a tool. In some examples, the shaping comprises forming a desired wrinkle configuration in the conformable material. An example tool for forming a composite structure includes a curved region comprising undulations in at least one portion of the curved region, the undulations configured such that when a conformable material is draped over the curved region, a desired wrinkle configuration is imparted to the conformable material.

DESCRIPTION

Methods and tools for shaping conformable material are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As used herein, a composite structure refers to a structure that is constructed of composite materials, such as (but not limited to) fiber reinforced composite materials. Illustrative, non-exclusive examples of fiber reinforced composite materials include at least an epoxy or other polymer or binding material together with fibers, such as constructed of (but not limited to) glass fibers, carbon fibers, boron fibers, para-aramid fibers, and/or other fibers. In some examples, composite structures may be constructed of multiple layers, or plies, of fiber reinforced composite material, and may be described as a composite laminate or lamination. In some such examples, the plies may be pre-preg plies, which are layers, or sheets, of fibers that are pre-impregnated with the associated binding material. Accordingly, multiple pre-preg plies may be layered to collectively define a segment of fiber reinforced composite material having desired properties and characteristics. In some examples, each ply has fibers running in a single direction (i.e., unidirectional fibers). In some examples, a layup of multiple plies may include fibers oriented in more than one direction, such as at 0, 45, 90, and 135 degrees.

Curing of the conformable material forms the composite structure. Prior to being cured, or fully cured, the composite material may be somewhat flexible, or at least flexible relative to a cured state of the composite material. Accordingly, these composite materials also may be described as conformable material, and may be in the form of a sheet, or charge. Prior to being cured, the conformable material may be molded or otherwise formed into a desired contour. To help control and/or form the shape of a composite structure, the conformable material is placed on a tool, such as a rigid mold, and laid down to follow the shape of the tool. As such, the conformable material adopts the shape of the tool and, when cured, maintains that shape. Upon being cured, the composite materials become rigid and hold their shape, yet may have a desired resilience depending on a particular application for the composite structure.

Figure 1:
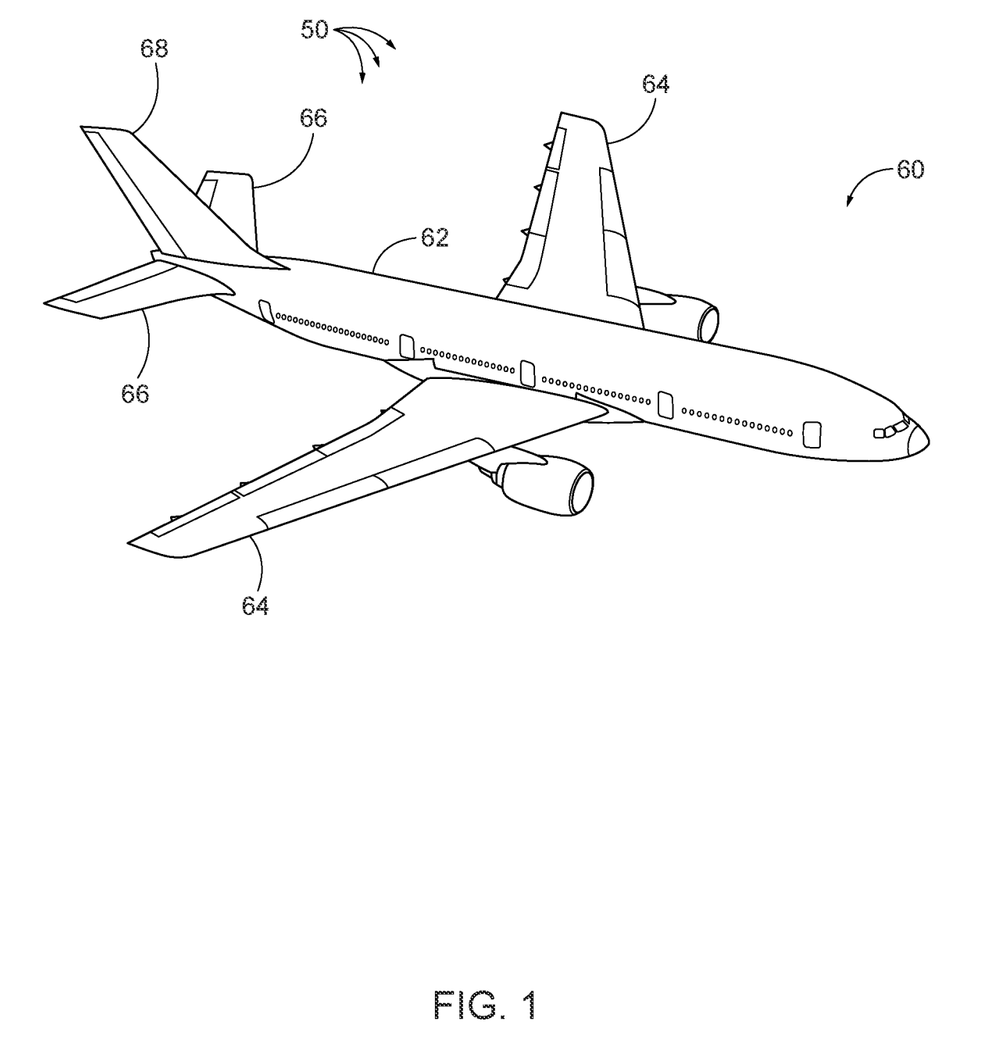
FIG. 1 is a perspective view of an illustrative, non-exclusive example of an aircraft.

In FIG. 1, an example aircraft 60, which may include various composite structures 50, is provided. Aircraft 60 typically may be described as including a fuselage 62, which generally corresponds to the main body of an aircraft for holding passengers, crew, cargo, and/or equipment, for example, depending on the particular configuration and/or function of an aircraft. Typically, although not required, the fuselage of an aircraft is elongate and somewhat cylindrical or tubular. Aircraft 60 also may include wings 64, horizontal stabilizers 66, and a vertical stabilizer 68. One or more of the fuselage, wings, horizontal stabilizers, and vertical stabilizers, or portions thereof, may be constructed of composite materials. In some examples, such structures may be described as stiffened composite structures, such as being defined by a skin supported by a structural frame, or stiffeners. Any one or more of the aforementioned various structures of an aircraft, as well as other structures of an aircraft, may be described as contoured composite structures. By contoured, it is meant that such structures define non-planar surfaces. Some examples of contoured composite structures according to the present disclosure may have non-planar surfaces with a complex contour, meaning that within a given region of the surface, the intersection with any orientation of a plane is not linear.

Though FIG. 1 illustrates an aircraft with composite structures 50, apparatuses other than aircraft are within the scope of the present disclosure and may include composite structures. For example, as illustrative, non-exclusive examples, other apparatuses that may include composite structures include (but are not limited to) spacecraft, watercraft, land vehicles, wind turbines, structural towers and masts, etc. Moreover, aircraft 60 may take any suitable form, including commercial aircraft, military aircraft, private aircraft, or any other suitable aircraft. While FIG. 1 illustrates aircraft 60 in the form of a fixed wing commercial aircraft, other types and configurations of aircraft are within the scope of aircraft 60 according to the present disclosure, including (but not limited to) helicopters. The methods and tools described here may be used to manufacture composite structures in all the above illustrative fields as well as in any other field that utilizes composite materials in part manufacturing.

Figure 2:
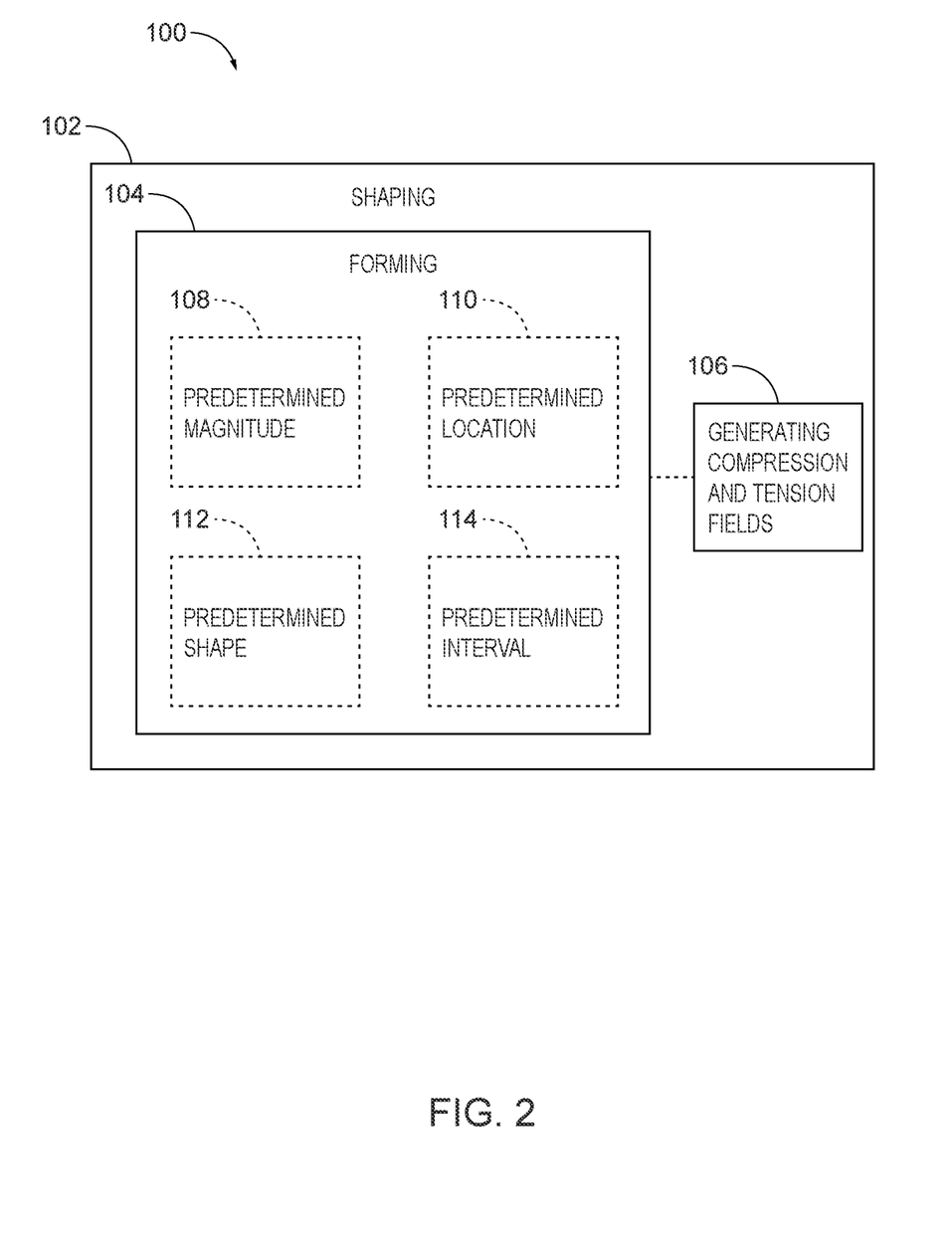
FIG. 2 is a flowchart schematically representing illustrative, non-exclusive examples of methods for shaping conformable material to have a desired wrinkle configuration.
Figure 3:
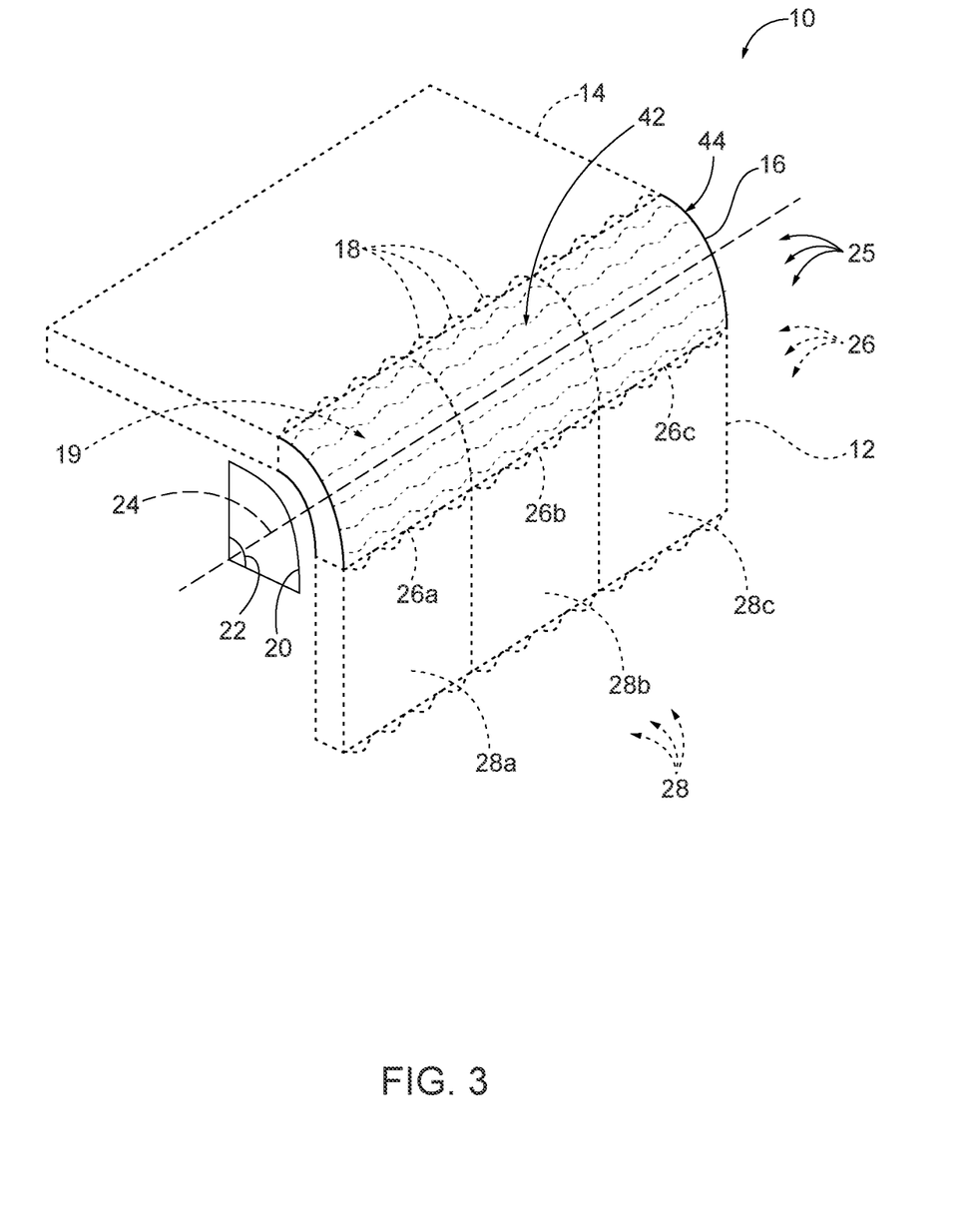
FIG. 3 is an isometric view of a first illustrative tool used to impart a desired wrinkle configuration.
Figure 4:
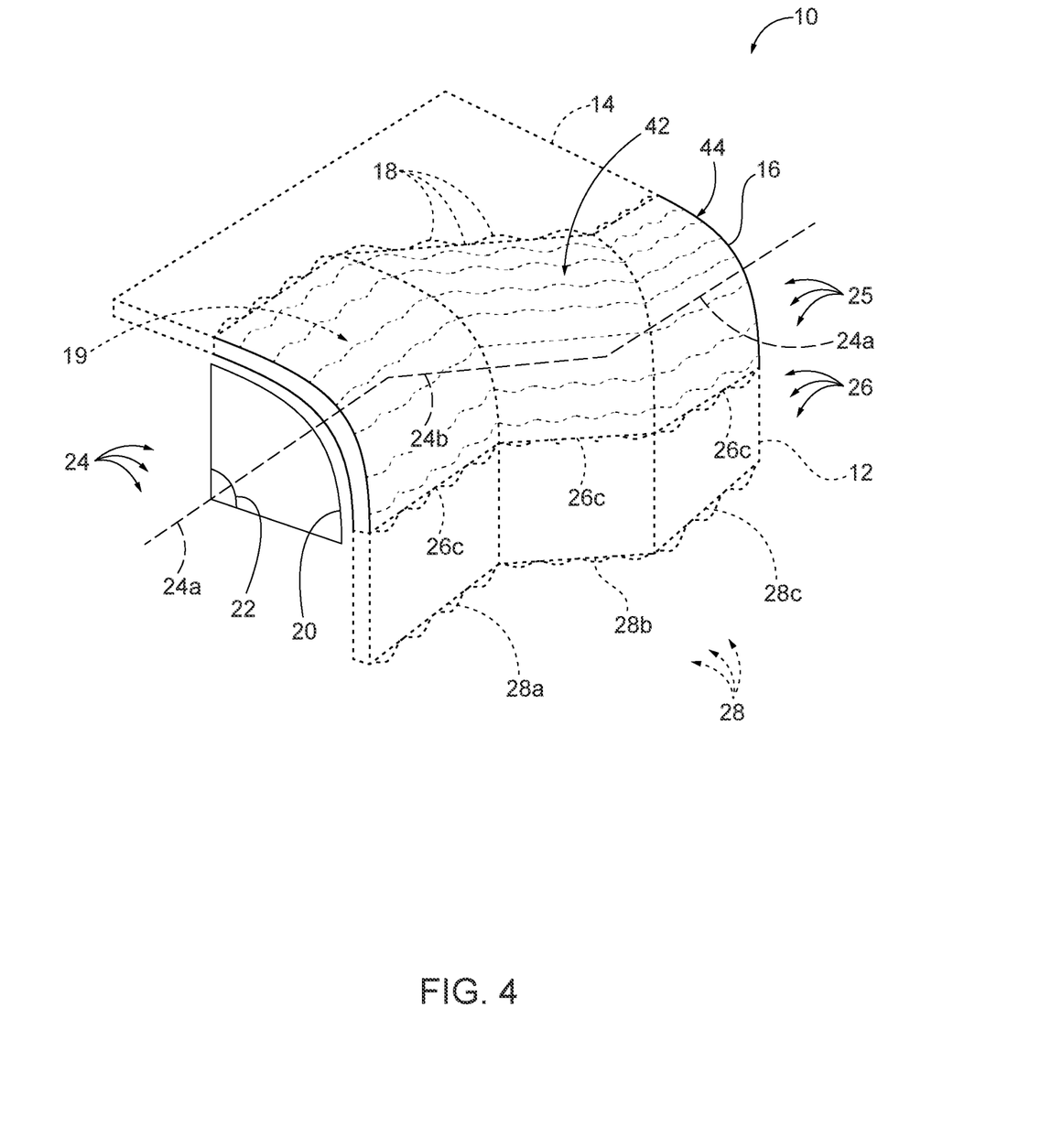
FIG. 4 is an isometric view of a second illustrative tool used to impart a desired wrinkle configuration.

FIG. 2 provides illustrative, non-exclusive examples of methods 100 of forming composite structures, and FIGS. 3-4 illustrate non-exclusive examples of tools 10, and component parts thereof, for forming composite structures 50, with such tools optionally being configured to perform or facilitate one or more methods 100 according to the present disclosure. Methods 100 and tools 10 may be utilized to prevent and/or reduce undesirable wrinkle configurations. Additionally or alternatively, methods 100 and tools 10 may be used to form, locate, and/or shape preferable wrinkle configurations in a composite structure during the manufacturing process. For example, a composite material may tend to wrinkle, or bunch up, along the edges when being shaped into a composite structure. Methods 100 and tools 10 may be used to decrease the presence of edge wrinkles in the composite material and generate preferable central wrinkles that are of acceptable dimensions.

Wrinkles can be defined as contours in the conformable material and/or in the composite structure. Wrinkles also may be defined as wave patterns in the conformable material, the wrinkles having a wave magnitude/amplitude and/or frequency. Methods 100 and tools 10 may be used to impart desired contours that meet the requisite quality standards for the composite structure being constructed, with such desired contours optionally being described as micro-wrinkles, micro-ridges, dimples, and/or wrinkles or ridges that are smaller in size than undesirable wrinkles. For example, depending on the desired contour of a surface of a composite structure, a flat charge of composite material may tend to wrinkle, or bunch up, when being molded into the desired contour. Methods 100 and tools 10 may be used to distribute the excess material that otherwise would create undesirable wrinkles, or bunched material, into micro-wrinkles, micro-ridges, and/or dimples that are of acceptable dimensions.

As used herein, desired wrinkle configuration refers to wrinkles in the conformable material within a certain range of magnitude, location, and/or intervals, etc. Additionally or alternatively, the conformable material may be described as having a predetermined wrinkle configuration and/or a desired wrinkled configuration. (e.g., a configuration of wrinkles and/or contours in a conformable material 34 shaped using the tool 10). Desired or predetermined does not mean that the features of the wrinkles are fixed to exact specifications, but instead that the wrinkle features are confined within a desirable range, within acceptable dimensions as determined by requisite quality standards, and/or within an acceptable threshold of quality standards. The scale of the range depends on such factors as the type of conformable material used, the material properties of the conformable material, the thickness of the conformable material, the shape of the tool, the process of curing the material, etc. For example, for an illustrative conformable material, imparting a desired wrinkle configuration means using the tool to generate wrinkles in the conformable material within an amplitude magnitude of 0.02-0.5 centimeters (cm).

FIG. 2 schematically provides a flowchart that represents illustrative, non-exclusive examples of methods 100 according to the present disclosure. In FIG. 2, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 2 are not limiting and other methods and steps are within the scope of the present disclosure, including methods having greater than or fewer than the number of steps illustrated, as understood from the discussions herein.

With reference to FIGS. 2-4, methods 100 includes shaping 102 a conformable material 34 using a tool 10. The shaping 102 may include imparting a predetermined configuration into the conformable material 34. For example, the shaping 102 the conformable material 34 includes creating an overall part shape in the conformable material 34. In some examples, the shaping 102 initially results in one or more undesirable wrinkles in the conformable material 34. To counter such undesirable wrinkles, the shaping 102 comprises, in some examples, forming 104 a desired wrinkle configuration 36 in the conformable material 34. In some examples, the forming 104 the desired wrinkle configuration 36 includes using a tool 10 comprising a curved region 16 with undulations 18 in at least one portion 25 of the curved region 16. These undulations 18 are configured such that the shaping 102 results in the desired wrinkle configuration 36 imparted in the conformable material 34.

As seen in FIGS. 3-4, the tool 10 for manufacturing composite parts comprises the curved region 16, which comprises undulations 18 in at least one portion 25 of the curved region 16. The overall shape of the tool 10 is configured around the desired shape and/or contour of the composite structure 50 being manufactured. The undulations 18 are configured such that when a conformable material 34 is draped over the curved region 16 of the tool 10, a desired wrinkle configuration 36 is imparted to the conformable material 34.

The curved region 16 has a curved-region arclength 20 and a curved-region degree of curvature 22. In some examples, the curved-region arclength 20 and the curved-region degree of curvature 22 vary to form the undulations 18. For example, peaks of the undulations correspond to greater curved-region arclengths 20 while troughs of the undulations correspond to lesser curved-region arclengths 20. The curved-region degree of curvature 22 defines the angle through which the curved region 16 goes through. For example, the curved region 16 may travel through a curved distance corresponding to 15, 30, 45, 60, 75, and/or more than 90 degrees.

The curved region 16 further comprises a longitudinal axis 24. In some examples, the curved-region arclength 20 and the curved-region degree of curvature 22 are relative to the longitudinal axis 24. In some examples, the curved region 16 comprises a plurality of sections 26 along a length of the curved region 16. As schematically illustrated in FIGS. 3-4, the portions 25 of the curved region 16 which comprise the undulations 18 may be located at more than one area of curved region 16. In some examples, one portion 25 of the curved region 16 where the undulations 18 are present is located at the medial area 42 of the curved region 16. Additionally or alternatively, one portion 25 may be located at the lateral area 44 of the curved region 16. In some examples, a portion 25 may be located at an intersection between at least two sections 26a and 26b and/or 26b and 26c of the plurality of sections 26.

In some examples, such as is illustrated in FIG. 3, the longitudinal axis 24 has the same orientation throughout the tool 10. As illustrated the second embodiment of the tool 10, depicted in FIG. 4, the longitudinal axis 24, in some examples, has a first orientation 24a and a second orientation 24b that has a direction different from the first orientation 24a. Continuing with the second embodiment of the tool 10, in some examples, at least two sections 26a, 26c of the plurality of sections 26 are parallel to the first orientation 24a of the longitudinal axis 24, while at least one section 26b of the plurality of sections 26 is parallel to the second orientation 24b of the longitudinal axis 24 of the curved region 16. However, the illustrated examples in FIGS. 3-4 do not limit the possible configurations of the tool 10, which depend on the application and/or manufacturing process being done, including but not limited to the type of conformable material used and/or the process of curing the material, as well as what other steps are involved in the manufacturing.

The undulations 18 of the tool 10 are portions of the tool 10 where the curved-region arclength 20 varies relative to a non-varying area 19. In some examples, the undulations 18 are built into the tool 10 during the manufacturing of the tool 10. The undulations 18 can vary in orientation, amplitude, shape, interval, etc., to match with the designs of a composite structure 50. In some examples, the undulations 18 all have the same orientation, amplitude, and/or frequency. In other examples, the undulations 18 vary in orientation, amplitude, and/or frequency across the curved region 16. The varying may be exponential, logarithmic, geometric, etc., and may be increasing in magnitude or decreasing. In some examples, the undulations 18 are in a wave pattern. In some such examples, the wavelength of the wave pattern varies across the curved region. The varying may be exponential, logarithmic, geometric, etc., and may be increasing in magnitude or decreasing. In some examples, a magnitude of the undulations 18 is between 0.05-1.5 cm relative to the non-varying area 19 of the curved region 16. In some examples, the undulations 18 have a sinusoidal shape. Other shapes of waves, including, but not limited to, triangle, sawtooth, and square, are also possible shapes for undulations 18 to have, as are combinations of multiple wave shapes. In some examples, the undulations 18 are machined or additively manufactured into the tool 10. Additionally or alternatively, a secondary piece having undulations 18 can be applied to the tool 10, allowing for faster changeover times to modify the tool 10 for different applications.

Incorporation of the undulations 18 has the effect of imparting a desired wrinkle configuration 36 in the conformable material 34 when the conformable material 34 is draped over and/or pressed against the tool 10. In some examples, this desired wrinkle configuration 36 is generated because the undulations 18 bunch up the conformable material 34. In some examples, the frequency of wrinkles increases in areas with the undulations 18 relative to areas without the undulations 18, allowing for more desirable wrinkled configurations to be generated. Accordingly, incorporating the undulations 18 eliminates and/or decreases undesirable wrinkles, advantageously eliminating the need to later correct undesirable wrinkles.

In some examples, the tool 10 further comprises a first surface region 12 extending from the curved region 16, as schematically illustrated in FIGS. 3-4. The first surface region 12 may be planar or curved and may be comprised of material that is the same as or different from the curved region 16. The first surface region 12, in some examples, possesses a ruled surface (e.g., has a planar, cylindrical, conical, curved, or other ruled shape). In some examples, the first surface region 12 provides support for the conformable material 34. Additionally or alternatively, the first surface region 12 shapes the conformable material 34. For example, the first surface region 12 may comprise undulations 18 and be configured to impart the desired wrinkle configuration 36 to the conformable material 34. The first surface region 12 may comprise undulations in addition to or instead of the curved region 16. Furthermore, in some examples, the undulations of curved region 16 are integral and/or continuous with the undulations of first surface region 12.

In some examples, the first surface region 12 comprises a plurality of sub-regions 28. In some examples, the undulations 18 are disposed adjacent to at least one sub-region 28b of the first surface region 12. In some examples, as illustrated in FIG. 4, at least one sub-region 28b of the plurality of sub-regions 28 is parallel to the second orientation 24b of the longitudinal axis 24 and is disposed between at least two adjacent sub-regions 28a, 28c parallel to the first orientation 24a of the longitudinal axis 24. With continued reference to FIG. 4, in some examples, the plurality of sub-regions 28 corresponded to the plurality of sections 26 of the curved region 16. For example, sub-region 28a extends from section 26a of the curved region 16.

Returning to both FIGS. 3-4, in some examples, the tool 10 further comprises a second surface region 14 extending from the curved region 16 opposite the first surface region 12 relative to the curved region 16. Similar to the first surface region 12, the second surface region 14 may be planar or curved and may be comprised of material that is the same as or different from the curved region 16. In other words, the second surface region 14, in some examples, possess a ruled surface (e.g., has a planar, cylindrical, conical, or curved shape). In some examples, undulations 18 are disposed on the second surface region. For example, the undulations 18 may be disposed adjacent to the region between the second surface region 14 and the curved region 16. In some examples, the curved region 16 has a maximum arclength between the first surface region 12 and the second surface region 14. In other words, the max surface extent of the curved region 16 is bound between the first surface region 12 and the second surface region 14. Furthermore, in some examples the curved region 16 is integral and/or continuous with the first surface region 12 and/or the second surface region 14.

Figure 5:
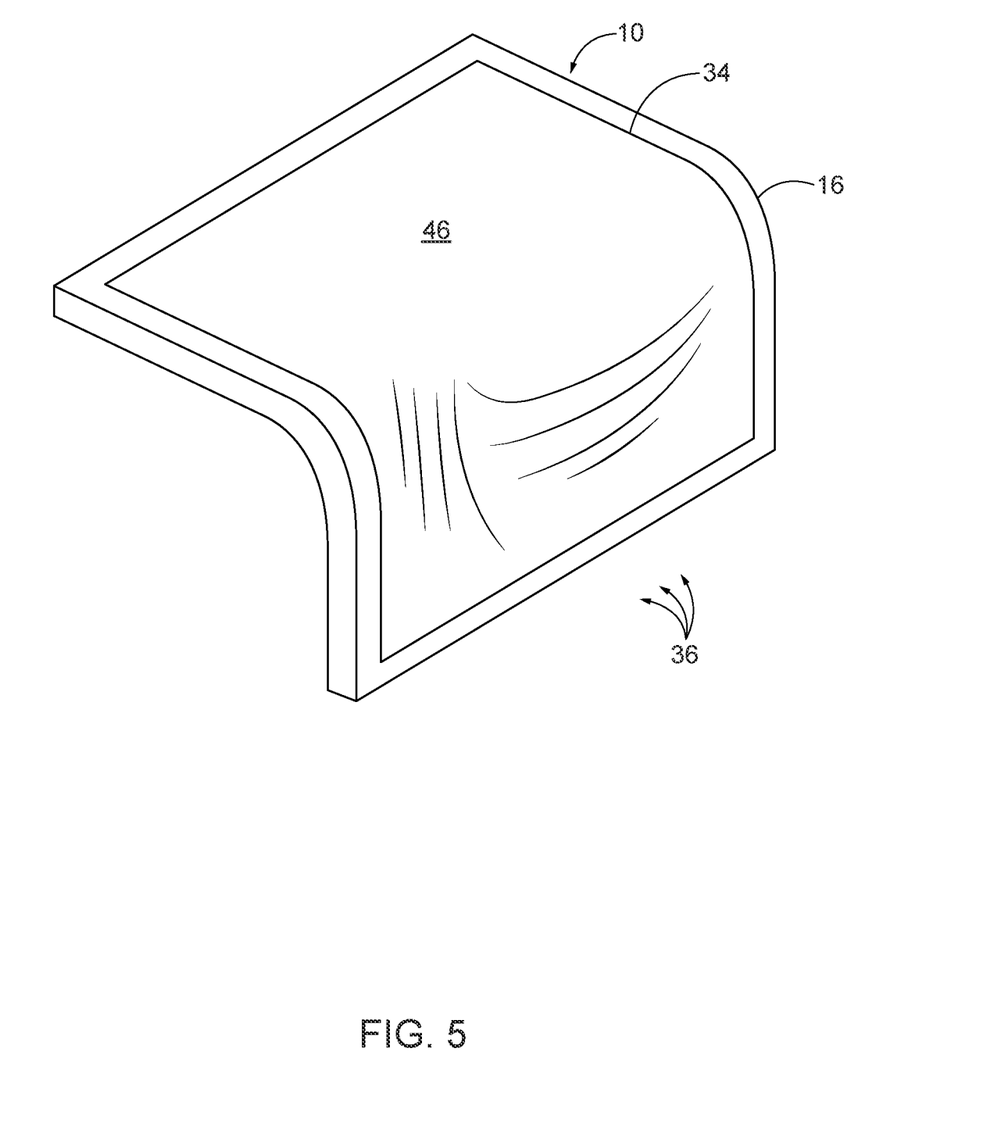
FIG. 5 is a schematic view of a conformable material with a desired wrinkle configuration shown on a tool.

FIG. 5 illustrates an example of a conformable material 34 draped upon a tool 10. The tool 10 illustrated in FIG. 5 is similar to the first embodiment of the tool 10 illustrated in FIG. 3, but any reasonable configuration of the tool 10 applies here. In response to being draped upon the tool 10, a desired wrinkle configuration 36 is imparted to the conformable material 34. In some examples, the desired wrinkle configuration 36 forms when the conformable material 34 is draped upon the tool 10. Additionally or alternatively, the desired wrinkle configuration 36 forms at some point during the curing process of the conformable material 34. A variety of wrinkle shapes and orientations may be imparted onto the conformable material 34, including but not limited to, substantially straight or curved wrinkles and substantially vertical, horizontal, or angled (relative to the curved region)

wrinkles. By "substantially straight," it is meant that at least 50% of the length of the respective wrinkle does not deviate from a straight line by more than 10% of the length of the respective wrinkle. In some examples, the configuration and/or material of the conformable material 34 affects how the wrinkles are imparted. For example, the conformable material 34 may be a composite material with fibers oriented such that one shape of wrinkle (e.g., straight) appears on the conformable material 34 when being shaped.

Figure 6:
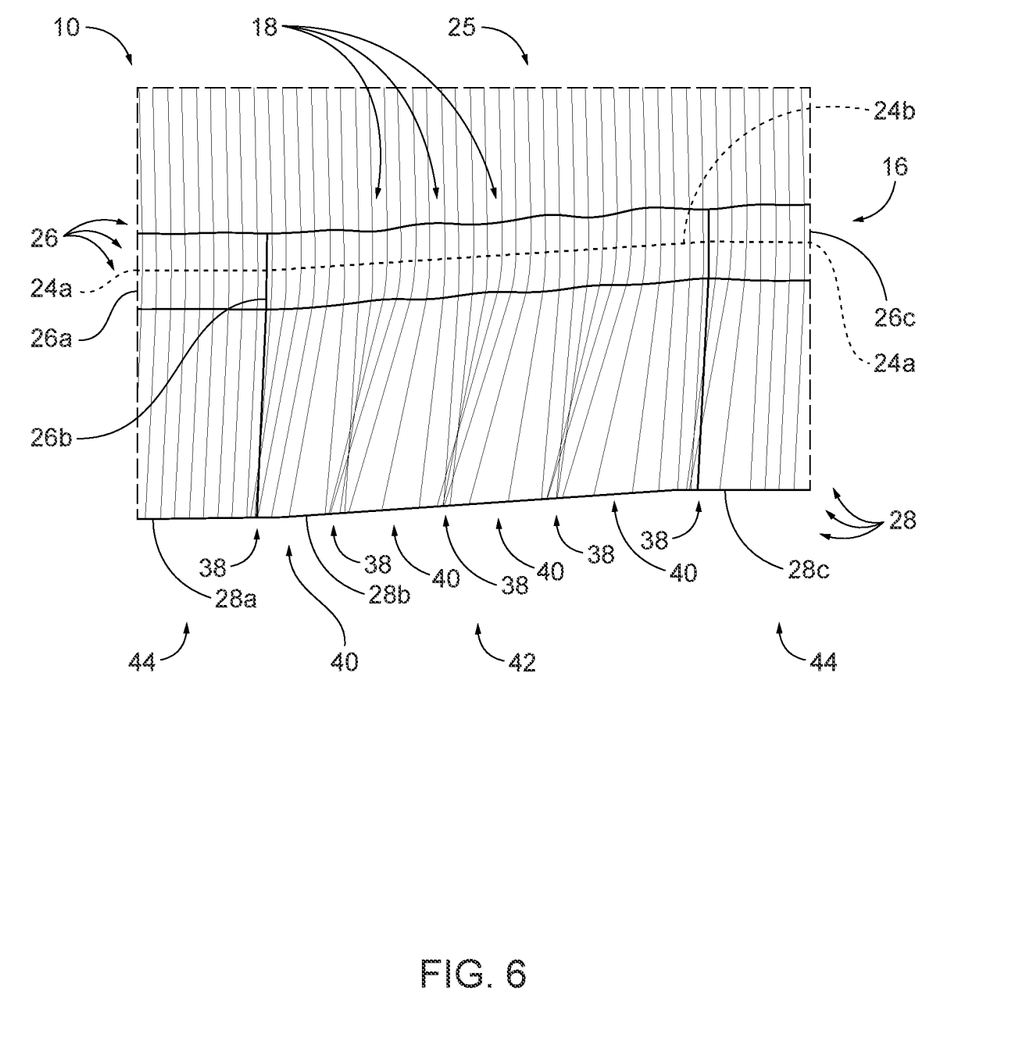
FIG. 6 is a schematic view of illustrative compression fields and tension fields that may be present in the first and/or second illustrative tool.
Figure 7:
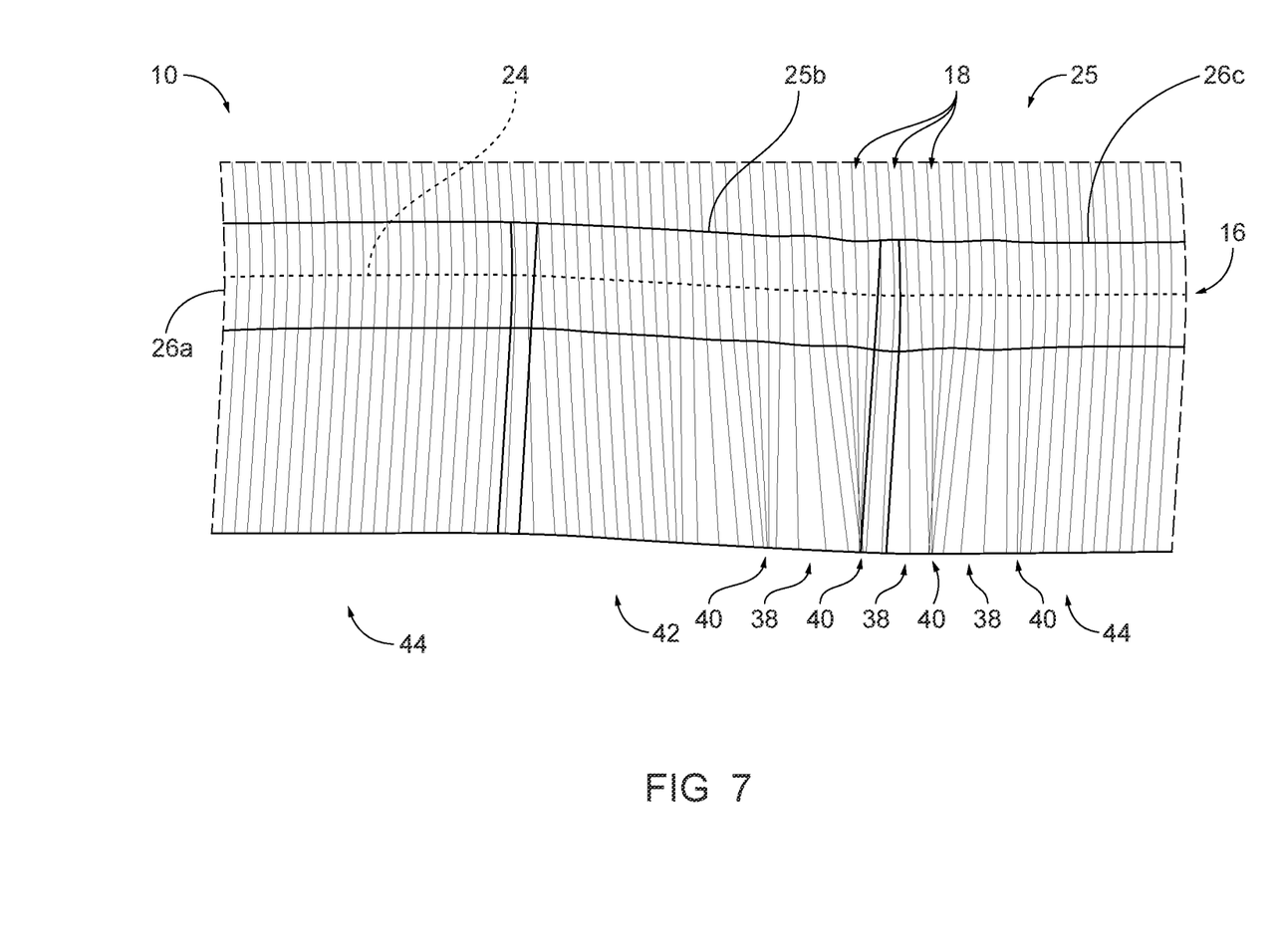
FIG. 7 is a schematic view of illustrative compression fields and tension fields that may be present a third illustrative tool used to impart a desired wrinkle configuration.

FIGS. 6 and 7 illustrate examples of compression fields 38 and tension fields 40 along the surface of two tools 10. The lines representing the compression fields 38 and the tension fields 40 are not themselves present in the tools 10, that is, the tools 10 are not experiencing these forces. The lines illustrate, instead, where forces will be present when a conformable material 34 is placed on the tools 10. In other words, the compression fields 38 and the tension fields 40 are generated in the conformable material 34 in response to the conformable material 34 being placed on the tools 10. Areas where the lines are spaced close together and/or overlap represent places of compression forces, while areas where the lines are spaced apart represent places of tension forces.

In the example illustrated in FIG. 6, the portion 25 of the curved region 16 with undulations 18 is present in a medial area 42 of the curved region 16, with two lateral areas 44 being parallel to each other and the medial area 42 extending between the two lateral areas 44, similar to the schematic representation of the tool 10 in FIG. 4. As illustrated in the example of FIG. 6, the undulations 18 cause an alternating pattern of compression and tension forces. These alternating compression and tension forces throughout the conformable material 34 reduce and/or distribute the compression and tension forces from peak areas and/or undesirable areas. For example, intersections between the sections 26 and intersections between the sub-regions 28 of the first surface region of the tool can be areas of high tension or compression in the conformable material 34, particularly if the sections 26 and the sub-regions 28 have different angles at the intersection (e.g., sub-region 28a is parallel to the first orientation 24a of the longitudinal axis and sub-region 28b is parallel to the second orientation 24b of the longitudinal axis). Inclusion of the undulations 18 reduce and/or distribute the compression and tension forces in the conformable material 34 located at these intersections. In some examples, the troughs of the undulations 18 correspond to the compression fields 38 and the peaks of the undulations 18 correspond to the tension fields 40 in the conformable material 34. In some such examples, the compression fields 38 are generated in the conformable material 34 because the material bunches up within the troughs of the undulations 18, compressing the material. In the same example, the tension fields 40 are generated by the pulling of the bunched up portions of the conformable material 34.

In the example illustrated in FIG. 7, the portion 25 of the curved region 16 with undulations 18 spans the transition from the medial area 42 to the right-side lateral area 44 where a change in angle of the longitudinal axis 24 takes place. That is, the overall tool 10 is similar in shape to the tools 10 of FIGS. 4 and 6, but with the undulations 18 positioned laterally to the right from wherein the undulations are positioned on the tool 10 of FIG. 6. As illustrated in the example of FIG. 7, the undulations 18 cause an alternating pattern of compression and tension forces centered about the angled transition of the longitudinal axis 24.

The advantage of forming a desired wrinkle configuration 36 is that undesirable wrinkles can be removed, lessened, moved to a more desirable location, precisely located, or even avoided. In some examples, wrinkles may be moved to a portion of the conformable material that will be removed during the manufacturing process, thereby eliminating the wrinkles altogether from the part being formed. This improves the quality of the part being manufactured and/or lets the part meet requisite quality standards. Such improvements may be in the aerodynamic qualities of a part (e.g., less drag), the structural integrity of a part (e.g., increased strength), the aesthetic appearance of part, etc. Additionally, a desirable wrinkled configuration may be imparted without adding additional steps to the manufacturing process and while eliminating rework that typically is required with prior art methods.

With reference to FIGS. 2-4, in some examples, the shaping 102 comprises generating 106 a plurality of alternating compression fields 38 and tension fields 40 in the conformable material 34 such that the shaping 102 results in the desired wrinkle configuration 36 of the conformable material. Tension and compression refer to the forces present in the conformable material during manufacturing (e.g., during the forming and/or curing process) that place different areas of the material under tension and/or compression. As illustrated in FIG. 2, the generating 106 the compression fields 38 and the tension fields 40 in some examples is part of the forming 104 the desired wrinkle configuration 36. In other words, in some examples, the generating 106 the compression fields 38 and the tension fields 40 in the conformable material results in the desired wrinkle configuration 36 and counters and/or prevents undesirable wrinkles. For example, if tension forces in the conformable material are such that the conformable material is pulled from a first area towards a second area, the second area may form wrinkles as more of the conformable material is pulled and/or piled there.

In some examples, these tension fields are generated by the undulations 18. As the conformable material conforms to the shape of tool 10 and follows the shape of the undulations, the undulations may result in tension and compression forces. Additionally or alternatively, the compression fields 38 and tension fields 40 may be generated by an overall shape of the tool 10 (e.g., the dimensions of the tool). How the overall shape of the tool 10 generates tension and compression fields is similar to how the undulations generate tension and compression forces in the material. Because compression fields and tension fields are usually present in the manufacturing of composite structures 50, controlling the attributes of these fields is advantageous.

In some examples, the forming 104 the desired wrinkle configuration 36 comprises generating 108 at least one wrinkle with a desired (or predetermined) magnitude. Magnitude may be defined as the height and/or amplitude of a wrinkle relative to a normal (i.e., unwrinkled) height of the material, for example, relative to a non-varying area 19 of the tool 10. Magnitude may also be defined as the total height and/or amplitude of the wrinkle (e.g., measuring from the peak of the wrinkle to the trough of the wrinkle). In some examples, the range is between 0.02-0.5 cm. Depending on the application, other ranges are possible and depends on such factors as the type of conformable material used, the material properties of the conformable material, the thickness of the conformable material, the shape of the tool, the process of curing the material, etc. In some examples, the desired magnitude varies along the length of the curved region 16. The varying may be exponential, logarithmic, geometric, etc., and may be increasing in magnitude or decreasing. For example, the magnitude may be near the max end of a range around the medial area 42 of the curved region 16 and then exponentially decreases going from the medial to lateral areas 44.

In some examples, the forming 104 the desired wrinkle configuration 36 comprises forming at least one wrinkle, and optionally only wrinkles, having a length less than a desired maximum length. For example, the maximum length may be in the range of 1.5-30 cm or more. In some examples, the forming 104 the desired wrinkle configuration 36 comprises forming at least one wrinkle, and optionally only wrinkles, having a length to height ratio of 75-1,500 or greater.

In some examples, the forming 104 the desired wrinkle configuration 36 comprises forming 110 at least one wrinkle in a desired (or predetermined) location. In some examples, the desired location is adjacent to a medial area 42 of the curved region 16. In some examples, the medial area 42 is relative to the longitudinal axis 24. In some examples, the desired location is adjacent to a lateral area 44 of the curved region 16. In some examples, the lateral area 44 is relative to the longitudinal axis 24. In some examples, the desired location comprises of a plurality of areas along the curved region that may be continuous or discrete. For example, the desired location may comprise of a first area adjacent to or within the lateral area 44 of the curved region 16 and a second area discontinuous from the first area and adjacent to or within the medial area 42 of the curved region 16. The desired location is defined as a general region. For example, if the desired location is adjacent to the medial area 42 of the curved region 16, then wrinkles will be generated adjacent to the medial area 42, but the exact locations adjacent to the medial area 42 may vary between different manufacturing jobs. In some examples, the location depends on such factors as the type of conformable material used, the material properties of the conformable material, the thickness of the conformable material, the shape of the tool, the process of curing the material, etc.

In some examples, the forming 104 the desired wrinkle configuration 36 comprises forming 112 at least a first wrinkle with a first desired (or predetermined) shape. Such desired shapes may include a wrinkle that is substantially straight or is curved. Desired shapes may further include the orientation of wrinkles. For example, straight wrinkles may be generated in the conformable material 34 that extend parallel to the edges of the tool 10. Additionally or alternatively, straight wrinkles may be generated that extend parallel to the fiber direction of the conformable material 34. In some examples, the desired shape is related to the location. For example, wrinkles generated in the conformable material adjacent to or within the lateral area 44 of the tool 10 may be curved while wrinkles generated in the conformable material adjacent to or within the medial area 42 of the tool 10 may be straight. In some examples, the compression fields 38 and the tension fields 40 determine the shape of the wrinkle. For example, straight or flange wrinkles may appear in a compression field 38. Additionally or alternatively, curved wrinkles may appear in a tension field 40. The desired shape does not mean that the exact shape is determined by the tool 10, and instead means that a general shape of the wrinkles are confined within a desirable range or within acceptable dimensions as determined by requisite quality standards. The scale of the range depends on such factors as the type of conformable material used, the material properties of the conformable material, the thickness of the conformable material, the shape of the tool, the process of curing the material, etc.

In some examples, the forming 104 the desired wrinkle configuration comprises forming 112 at least a second wrinkle with a second desired (or predetermined) shape. The second wrinkle may be of a similar shape to the first wrinkle or may have a shape different from the first wrinkle. For example, the first desired shape and/or the second desired shape may be substantially straight. In another example, the first desired shape and/or the second desired shape may curve across a surface 46 of the conformable material 34. In yet another example, the first desired shape and/or the second desired shape may have a wave-like shape in the conformable material 34.

In some examples, the forming 104 the desired wrinkle configuration comprises forming 114 a plurality of wrinkles at desired intervals along the conformable material 34. Desired intervals as used herein is defined as the distance between two or more wrinkles. Desired intervals may also be defined as the period or frequency of wrinkles. The forming 104 the plurality of wrinkles at desired (or predetermined) intervals then, in some examples, means generating wrinkles that appear a certain distance from each other and/or at a certain frequency within a given region. In some examples the desired intervals vary along the length of the curved region 16. The varying may be exponential, logarithmic, geometric, etc., and may be increasing in magnitude or decreasing. For example, the interval between wrinkles may exponentially increase along the length of the curved region 16. In some examples, the intervals between wrinkles are desired to be random, and the undulations would be configured to generate such random intervals in the conformable material. Desired intervals does not mean that the intervals of wrinkles are fixed to exact specifications but instead that the wrinkle intervals are confined within a desired range or within acceptable dimensions as determined by requisite quality standards. The scale of the range depends on the type of conformable material used, the thickness of the conformable material, the shape of the tool, the process of curing the material, and other steps involved in manufacturing.

Illustrative, non-exclusive examples of inventive subject matter according to the present disclosure are described in the following enumerated paragraphs:

A. A method (100) of manufacturing parts, the method (100) comprising:
shaping (102) a conformable material (34) using a tool (10), wherein the shaping (102) comprises forming (104) a desired wrinkle configuration (36) in the conformable material (34).

A1. The method (100) of paragraph A, wherein the tool (10) comprises a curved region (16) with undulations (18) in at least one portion (25) of the curved region (16), wherein the undulations (18) are configured such that the shaping (102) results in the desired wrinkle configuration (36) in the conformable material (34).

A1.1. The method (100) of paragraph A1 wherein an arclength (20) and a degree of curvature (22) of the curved region (16) varies along a length of the curved region (16) to form the undulations (18).

A2. The method (100) of any of paragraphs A-A1.1, wherein the shaping (102) comprises generating (106) a plurality of alternating compression fields (38) and tension fields (40) in the conformable material (34) such that the shaping (102) results in the desired wrinkle configuration (36) being imparted in the conformable material (34).

A3. The method (100) of any of paragraphs A-A2, wherein the forming (104) the desired wrinkle configuration (36) comprises generating (108) at least one wrinkle within a desired magnitude.

A3.1. The method (100) of paragraph A3, wherein the desired magnitude is within a range between 0.15 and 0.05 centimeters.

A3.2. The method (100) of any of paragraphs A3-A3.1, wherein the desired magnitude varies along a/the length of the curved region (16).

A4. The method (100) of any of paragraphs A-A3.2, wherein the forming (104) the desired wrinkle configuration (36) comprises forming (110) at least one wrinkle in a desired location.

A4.1. The method (100) of paragraph A4, wherein the desired location is adjacent to a medial area (42) of the curved region (16).

A4.2. The method (100) of paragraph A4, wherein the desired location is adjacent to a lateral area (44) of the curved region (16).

A5. The method (100) of any of paragraphs A-A4.2, wherein the forming (104) the desired wrinkle configuration (36) comprises forming (112) at least a first wrinkle with a first desired shape.

A5.1. The method (100) of paragraph A5, wherein the forming (104) the desired wrinkle configuration (36) comprises forming (112) at least a second wrinkle with a second desired shape.

A5.2. The method (100) of any of paragraphs A5-A5.1, wherein the first desired shape and/or a/the second desired shape is substantially straight across a/the surface (46) of the conformable material (34).

A5.3. The method (100) of any of paragraphs A5-A5.2, wherein the first desired shape and/or a/the second desired shape curves across a/the surface (46) of the conformable material (34).

A5.4. The method (100) of any of paragraphs A5-A5.3, wherein the first desired shape and/or a/the second desired shape is sinusoidal in the conformable material (34).

A5.5. The method (100) of any of paragraphs A5-A5.4, wherein the first desired shape and/or a/the second desired shape varies along a/the length of the curved region (16).

A6. The method (100) of any of paragraphs A-A5.5, wherein the forming (104) the desired wrinkle configuration (36) comprises forming (114) a plurality of wrinkles at desired intervals along the conformable material (34).

A6.1. The method (100) of paragraph A6, wherein the desired intervals vary along a/the length of the curved region (16).

A7. The method (100) of any of paragraphs A-A6.1, wherein the conformable material (34) is a composite material.

A8. The method (100) of any of paragraphs A-A7, wherein the conformable material (34) is a fiber-reinforced composite material.

A9. The method (100) of any of the paragraphs A1-A8, wherein the parts are aerospace components.

A9.1. The method (100) of paragraph A9, wherein the aerospace components comprise a spar.

A10. The method of any of paragraphs A-A9.1, wherein the tool (10) is the tool (10) of any of paragraphs B-B10.

B. A tool (10) for manufacturing parts, the tool (10) comprising:
- a curved region (16), wherein the curved region (16) comprises undulations (18) in at least one portion (25) of the curved region (16), wherein the undulations (18) are configured such that when a conformable material (34) is draped over the curved region (16), a desired wrinkle configuration (36) is imparted to the conformable material (34).

B1. The tool (10) of paragraph B, wherein the curved region (16) has a curved-region arclength (20) and a curved-region degree of curvature (22), and wherein the curved-region arclength (20) and the curved-region degree of curvature (22) vary to form the undulations (18).

B2. The tool (10) of any of paragraphs B-B1, wherein the curved region (16) further comprises a longitudinal axis (24), and wherein the curved-region arclength (20) and the curved-region degree of curvature (22) are relative to the longitudinal axis (24).

B2.1 The tool (10) of paragraph B2, wherein the longitudinal axis (24) has a first orientation (24*a*) and a second orientation (24*b*) that has a direction different from the first orientation (24*a*).

B3. The tool (10) of any of paragraphs B2.1, wherein the curved region (16) comprises a plurality of sections (26) along a length of the curved region (16).

B3.1. The tool (10) of paragraph B3, wherein at least two sections (26*a*, 26*c*) of the plurality of sections (26) are parallel to each other.

B3.1.1. The tool (10) of paragraph B3 when depending from paragraph B2.1, wherein at least two sections (26*a*, 26*c*) of the plurality of sections (26) are parallel to the first orientation (24*a*) of the longitudinal axis (24) of the curved region (16).

B3.2. The tool (10) of any of paragraphs B3-B3.1.1, wherein at least one section (26*b*) of the plurality of sections (26) is parallel to the second orientation (24*b*) of longitudinal axis (24) of the curved region (16).

B4. The tool (10) of any of paragraphs B-B3.2, wherein the tool (10) further comprises a first surface region (12) extending from the curved region (16).

B4.1. The tool (10) of paragraph B4, wherein the first surface region (12) is planar.

B4.2. The tool (10) of paragraph B4, wherein the first surface region (12) is ruled.

B4.3. The tool (10) of any of paragraphs B4-B4.2, wherein the tool (10) further comprises a second surface region (14) extending from the curved region (16), opposite the first surface region (12) relative to the curved region (16).

B4.3.1. The tool (10) of paragraph B4.3, wherein the second surface region (14) is planar.

B4.3.2. The tool (10) of any of paragraphs B4.3-B4.3.1, wherein the curved region (16) has a maximum arclength between the first surface region (12) and the second surface region (14).

B4.4. The tool (10) of any of paragraphs B4-B4.3.2, wherein the first surface region (12) comprises a plurality of sub-regions (28).

B4.4.1. The tool (10) of paragraph B4.4, wherein the undulations (18) are disposed adjacent to at least one sub-region (28*b*) of the plurality of sub-regions (28) of the first surface region (12).

B4.4.2. The tool (10) of any of paragraphs B4.4-B4.4.1, wherein the at least one sub-region (28*b*) of the plurality of sub-regions (28) is parallel to the second orientation (24*b*) of the longitudinal axis (24) and is disposed between at least two adjacent sub-regions (28*a*, 28*c*) that are parallel to the first orientation (24*a*) of the longitudinal axis (24).

B5. The tool (10) of any of paragraphs B-4.4.2, wherein the undulations (18) all have the same orientation and amplitude across the curved region (16).

B6. The tool (10) of any of paragraphs B-4.4.2, wherein the undulations (18) vary in orientation and amplitude across the curved region (16).

B7. The tool (10) of any of paragraphs B-B6, wherein the undulations (18) are in a wave pattern.

B7.1. The tool (10) of paragraph B7, wherein the wavelength of the wave pattern varies across the curved region (16).

B8. The tool (10) of any of paragraphs B-B7.1, wherein a magnitude of the undulations (18) is between 0.5 and 0.05 centimeters relative to a non-varying area (19) of the curved region (16).

B9. The tool (10) of any of paragraph B3-B8, wherein the at least one portion (25) of the curved region (16) is located at an intersection between least two sections (26a, 26b) of the plurality of sections (26).

B10. The tool (10) of any of paragraph B-B9, wherein the at least one portion (25) of the curved region (16) is located at a medial area (42) of the curved region (16).

C. The use of the tool (10) of B-B10 to impart a desired wrinkle configuration (36).

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein May define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of manufacturing composite parts, the method comprising:
shaping a conformable composite material using a tool, wherein the shaping comprises forming a desired wrinkle configuration in the conformable composite material, wherein the tool comprises a curved region which connects a first surface region and a second surface region, wherein the curved region extends in an arclength between the first surface region and the second surface region, wherein the curved region comprises undulations in at least one portion of the curved region, wherein the shaping the conformable composite material comprises draping the conformable composite material over the tool, and wherein the desired wrinkle configuration is formed by the draping;
wherein the undulations are configured such that the shaping results in the desired wrinkle configuration being imparted in the conformable composite material;
wherein the arclength and a degree of curvature of the curved region varies along a length of the curved region to form the undulations.

2. The method of claim 1, wherein the forming the desired wrinkle configuration comprises generating at least one wrinkle within a desired magnitude, and wherein the desired magnitude varies along the length of the curved region.

3. The method of claim 1, wherein at least part of the desired wrinkle configuration is formed adjacent to a medial area of the curved region.

4. The method of claim 1, wherein the desired wrinkle configuration is adjacent to a lateral area of the curved region.

5. The method of claim 1, wherein the forming the desired wrinkle configuration comprises forming a plurality of wrinkles at desired intervals along the conformable composite material, and wherein the desired intervals vary along a length of the curved region of the tool.

6. The method of claim 1, wherein the forming the desired wrinkle configuration comprises forming at least a first wrinkle with a first desired shape, wherein the forming the desired wrinkle configuration comprises forming at least a second wrinkle with a second desired shape, and wherein the first desired shape and/or the second desired shape varies along the length of the curved region.

7. The method of claim 1, wherein the shaping comprises generating a plurality of alternating compression fields and tension fields in the conformable composite material such that the shaping results in the desired wrinkle configuration being imparted in the conformable composite material.

8. The method of claim 1, wherein the forming the desired wrinkle configuration comprises generating at least one wrinkle within a desired magnitude of between 0.5 and 0.02 centimeters.

9. The method of claim 1, wherein the forming the desired wrinkle configuration comprises forming at least a first wrinkle with a first desired shape.

10. The method of claim 9, wherein the forming the desired wrinkle configuration comprises forming at least a second wrinkle with a second desired shape.

11. The method of claim 10, wherein the first desired shape and/or the second desired shape is substantially straight across a surface of the conformable composite material.

12. The method of claim 10, wherein the first desired shape and/or the second desired shape curves across a surface of the conformable composite material.

13. The method of claim 10, wherein the first desired shape and/or the second desired shape is sinusoidal in the conformable composite material.

14. The method of claim 1, wherein the composite parts are aerospace components.

15. The method of claim 1, wherein the undulations comprise peaks and troughs, and wherein the peaks and the troughs extend in a direction of the arclength.

16. The method of claim 1, wherein the desired wrinkle configuration is formed at least partially in a first composite region of the conformable composite material, and wherein the first composite region of the conformable composite material is arranged over the second surface region and adjacent to the undulations of the curved region during the draping.

17. A method of manufacturing composite parts, the method comprising:
- shaping a conformable composite material using a tool, wherein the shaping comprises forming a desired wrinkle configuration in the conformable composite material, wherein the shaping the conformable composite material comprises draping the conformable composite material over the tool, and wherein the desired wrinkle configuration is formed by the draping;
- wherein the tool comprises a curved region with undulations in at least one portion of the curved region, wherein the undulations are configured such that the shaping results in the desired wrinkle configuration being imparted in the conformable composite material, wherein the curved region which connects a first surface region and a second surface region, wherein the curved region extends in an arclength between the first surface region and the second surface region;
- wherein the arclength and a degree of curvature of the curved region varies along a length of the curved region to form the undulations;
- wherein the shaping comprises generating a plurality of alternating compression fields and tension fields in the conformable composite material such that the shaping results in the desired wrinkle configuration being imparted in the conformable composite material;
- wherein the forming the desired wrinkle configuration comprises generating at least one wrinkle within a desired magnitude, wherein the desired magnitude is within a range between 0.5 and 0.02 centimeters, and wherein the desired magnitude varies along the length of the curved region;
- wherein the forming the desired wrinkle configuration comprises forming at least one wrinkle in a desired location, wherein the desired location is adjacent to a medial area of the curved region or is adjacent to a lateral area of the curved region; and
- wherein the forming the desired wrinkle configuration comprises forming at least a first wrinkle with a first desired shape and at least a second wrinkle with a second desired shape, wherein the first desired shape is substantially straight across a surface of the conformable composite material, and wherein the second desired shape curves across a second surface of the conformable composite material.

18. A method of manufacturing composite parts, the method comprising:
- shaping a conformable composite material using a tool, wherein the shaping comprises forming a desired wrinkle configuration in the conformable composite material, wherein the tool comprises a curved region which connects a first surface region and a second surface region, wherein the curved region extends in an arclength between the first surface region and the second surface region, wherein the curved region comprises undulations in at least one portion of the curved region, wherein the shaping the conformable composite material comprises draping the conformable composite material over the tool, and wherein the desired wrinkle configuration is formed by the draping;
- wherein the undulations are configured such that the shaping results in the desired wrinkle configuration being imparted in the conformable composite material;
- wherein the arclength and a degree of curvature of the curved region varies along a length of the curved region to form the undulations;
- wherein the desired wrinkle configuration comprises tension fields and compression fields, and wherein the tension fields and the compression fields correspond to a shape of the undulations.

19. The method of claim 18, wherein the undulations comprise peaks and troughs, and wherein the peaks and the troughs extend in a direction of the arclength.

20. The method of claim 18, wherein the desired wrinkle configuration is formed at least partially in a first composite region of the conformable composite material, and wherein the first composite region of the conformable composite material is arranged over the second surface region and adjacent to the undulations of the curved region during the draping.

* * * * *